United States Patent
Görlitz (10) Patent No.: US 6,199,780 B1
(45) Date of Patent: *Mar. 13, 2001

(54) METHOD AND APPARATUS FOR COMPACTING PARTICULATE MATERIAL

(75) Inventor: Frank-Otto Görlitz, Braunschweig (DE)

(73) Assignee: Bühler GmbH, Braunschweig (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,018

(22) Filed: Jun. 20, 1997

(30) Foreign Application Priority Data

Jun. 26, 1996 (DE) .............................. 196 25 483

(51) Int. Cl.⁷ .................................................... B02B 5/00
(52) U.S. Cl. .............................. 241/23; 241/13; 241/29; 241/276
(58) Field of Search .................... 241/6, 7, 13, 23, 241/28, 29, 26, 276, 101.2

(56) References Cited

U.S. PATENT DOCUMENTS

| | | | | |
|---|---|---|---|---|
| 3,596,712 | * | 8/1971 | Matsuoka | 165/92 |
| 3,612,169 | * | 10/1971 | Matsuoka | 165/86 |
| 3,984,055 | * | 10/1976 | Szkaradek | 241/36 |
| 3,993,254 | * | 11/1976 | Bicik et al. | 241/67 |
| 4,163,353 | * | 8/1979 | Finn et al. | 53/430 |
| 4,174,074 | * | 11/1979 | Geiger | 241/46.11 |
| 4,179,075 | * | 12/1979 | Rachais | 241/67 |
| 4,303,205 | * | 12/1981 | Geiger et al. | 241/17 |
| 4,428,535 | * | 1/1984 | Venetucci | 241/35 |
| 4,645,132 | * | 2/1987 | Fregnan | 241/30 |
| 4,730,789 | * | 3/1988 | Geiger | 241/69 |
| 4,936,515 | * | 6/1990 | Poag et al. | 241/36 |
| 5,139,205 | * | 8/1992 | Gallagher et al. | 241/33 |
| 5,269,469 | * | 12/1993 | Graenicher et al. | 241/6 |
| 5,379,952 | * | 1/1995 | Geiger | 241/65 |
| 5,407,138 | * | 4/1995 | Graenicher et al. | 241/6 |
| 5,607,113 | * | 3/1997 | McGuffin, Sr. et al. | 241/82.1 |

FOREIGN PATENT DOCUMENTS 2932783  3/1980  (DE) .
0485772  5/1992  (EP) .

* cited by examiner

*Primary Examiner*—Joseph J. Hail, III
*Assistant Examiner*—William Hong
(74) *Attorney, Agent, or Firm*—Martin A. Farber (57) ABSTRACT

When compacting particulate material, such as granular or powdery material, the same is fed to a first section which determines the compaction degree. In a second section, the weight/volume ratio is further increased so that it determines further the ultimate compaction degree. Optionally the compaction degree is controlled a third time within a third section which is normally the final section. In order to influence and to control the compaction degree at least in the first and second sections, energy can be absorbed by means of separate drives within these sections.

26 Claims, 2 Drawing Sheets

METHOD AND APPARATUS FOR COMPACTING PARTICULATE MATERIAL

FIELD OF THE INVENTION

This invention relates to a method for compacting particulate material which is fed in a first section determining the degree of compaction and the weight/volume ratio is increased in a second section determining its degree of compaction, after which the degree of compaction of the material might optionally be controlled a further time in a third section, generally forming the outlet.

BACKGROUND OF THE INVENTION

Such devices are used, in general, for compacting granular or powdery vegetable materials, such as cocoa or coffee, but also for teas and infusions to compact them prior to fill them into bags. For in packaging such bulk material, the problem arises that the bag should contain a predetermined weight, on the one hand, and that the bag should be well filled, on the other hand. This requires a predetermined bulk weight of the material, i.e. a predetermined weight/volume ratio (=specific density). This is especially a problem if different sorts of material, such as coffee, having undergone different degrees of treatment, such as different degrees of roasting or having a different fineness after milling, shall be packed, and overfilling or underfilling of the package should be avoided.

In a known device of this kind (see EP-A-0 485 772), a single shaft having, first, a feeding screw and then compacting tools comprising stirring and compacting paddles are provided, an adjustable outlet opening being postponed for final compaction. The size of the outlet opening is merely manually adjustable in order to cause the retaining effect requested and the correlated change of pressure.

It has now been found that, although such an arrangement meets the purpose, it involves also some disadvantages:

1. The throughput is determined by the number of revolutions, the pitch and the diameter of the feeding screw. With a given screw geometry, however, solely one number of revolutions will make sense. On the other hand, in case that another number of revolutions, e.g. a higher one, is required for the compaction unit, the feeding screw would produce unnecessary frictional work due to its retaining effect, thus heating the material in an undesirable manner.
2. The outlet cross-section, which remains fixed once it has been adjusted, does not guarantee a constant pressure, that is to say in case the throughput is not constant, i.e. with an increase of the throughput, the pressure within the apparatus will raise too, and vice-versa.

SUMMARY OF THE INVENTION

Therefore, it is an object of the invention to better control compacting of particulate material.

According to the invention this object is achieved in that energy can be absorbed separately within the feeding section and the compacting section by means of separate devices, thus influencing the degree of compaction within said sections independently from each other.

By proceeding in such a way, first the above-mentioned object will be attained. In addition, however, improved constructive possibilities will present themselves in a surprising manner. Namely, if one starts with an apparatus comprising a feeding device in the first section and a compacting device in the second section, optionally including a final compacting stage in a third or exit section, where the feeding device and the compacting device have separate drives, not only new facilities are created in view of adjustability and the possibility of a control, but it offers also more freedom with respect to a favorable selection of dimensions of both devices, especially if the feeding device and the compacting device are situated in different planes. For heretofore, the size was determined and limited by the series connection of both devices.

This is particularly favorable if a cooling unit for at least one of the compartments is provided. Although it is conceivable that the feeding or the compacting device is situated at the beginning of the respective section, it is more space saving and more efficient if at least one of the feeding device and the compacting device comprise at least one rotor, in which case the corresponding wall means form a stator surrounding the rotor. With such a design, an embodiment could be provided in which at least one of the rotor and the stator comprise the cooling facility.

BRIEF DESCRIPTION OF THE DRAWINGS

Further details of the invention will become apparent from the following description of embodiments schematically illustrated in the drawings wherein.

DETAILED DESCRIPTION OF THE DRAWINGS

Figure 1:
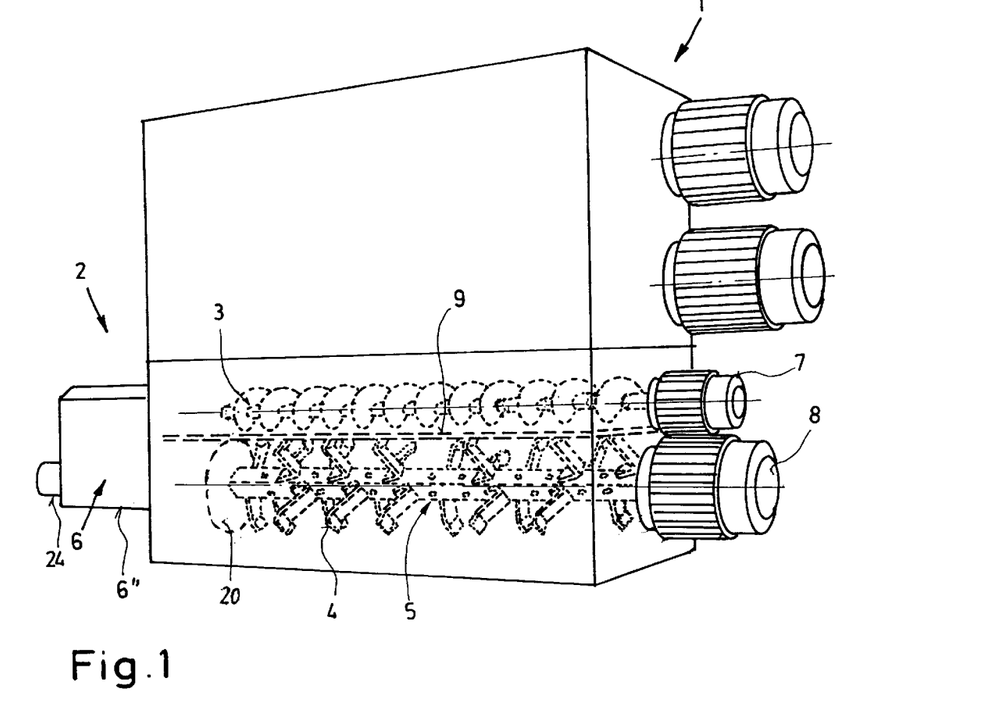
FIG. 1 shows a known coffee milling mechanism and an apparatus according to the invention arranged below, both shown in a perspective view.

In FIG. 1 a coffee roller mill 1 is represented which, in principle, may be constructed in the manner described in EP-A-0 485 772. Although the present invention is preferably used for compacting ground coffee, it will be understood that it can be applied wherever particulate, and specially granular or powdery material shall be packed into bags, boxes, drums or the like. Examples of such material are herbs, tea, cocoa powder and other food material of this kind.

Below the coffee roller mill 1, there is a compacting unit 2 which compacts the coffee ground in the roller mill 1 for packaging it into bags. Although the invention uses at least two sections wherein compacting steps are effected, according to a preferred embodiment of the invention, compacting is done within three sections, a first section comprising a feeding device of screw 3, preferably formed by a screw, whereas a second section includes a compacting rotor 5' preferably equipped with tools, such as paddles 4. A third section, forming a final compaction section 6, is located within a housing 6" shown in FIG. 1, and may be of any type known per se, such as described in EP-A-0 485 772, although a preferred embodiment will be described below which deviates from this known approach.

In accordance with the present invention, energy can be absorbed separately at least within the first and second section by means of separate devices in order to influence the degree of compaction within at least in these sections independently from each other. This is done by having separate drives, preferably separate motors 7, 8, for the feeding device 3, on the one hand, and for the compacting unit 2 on the other hand. Instead of separate motors 7, 8, of course a single motor and, particularly continuously, variable gears between the device 3 and the unit 2 could be provided.

In this way, an adjustment of the quantity of ground coffee fed to the compacting unit 2 is enabled by separately choosing the number of revolutions of the feeding device or screw 3. This can be done, in the case of a variable gear, simply by replacing a gear wheel, but in the case of the two motors 7, 8 shown by appropriate change of their numbers of revolution, for example, by means of a frequency converter, or by a variable gear connected to at least one of the motors 7 or 8. Thus, the amount of ground coffee fed to the compacting compartment formed by walls which surround the screw 3, on the one hand, and the rotor 5' of the compacting unit 2 on the other hand (only an interposed wall 9 is shown in FIG. 1) determines, in a first step, the degree of compaction. Then, it is likewise possible to raise the compaction degree achieved at the end of the feeding device 3 by increasing the power of the compacting rotor 5' as well as by reducing the amount of material fed by the screw 3 in order to increase, within certain limits, the compacting energy per ton of introduced material. The highest range of possible variations will be achieved, if both drives 7 and 8 are adjustable. A further possibility of variation can be provided at the final compacting device 6. Instead of a mere open loop control by simply adjusting the number of revolutions, it is, however, preferred to provide a closed loop control, as will be described below with reference to FIG. 3.

It will be understood that solely the independent influence or control of energy absorption is necessary to carry out the invention, and that the invention is, by no means, limited to the arrangement shown of a feeding device 3 and a compacting unit 2 in parallel, separated by an intermediate wall 9, although this arrangement is preferred for several reasons. It is also preferred to use a compacting section 5 including a rotor 5', though compacting could also be done by a reciprocable compacting plunger just with the arrangement chosen in parallel, as shown.

It would, however, also be conceivable to arrange the device 3 and the unit 2 in series, driving the feeding device 3 by means of a hollow shaft, whereas the compacting rotor 5' is driven by a second shaft supported within the hollow shaft. The advantage of the approach shown consists, however, mainly in that the screw 3 feeds ground coffee, delivered by the rollers of the roller mill 1, substantially uniformly over the whole width of the rollers of this roller mill 1 up to a transfer opening 10 (see FIG. 2) into the compacting compartment or section 11 of the compacting unit 2 situated in parallel. In this way, the coffee is pre-compacted, which can also be assisted by a screw pitch becoming more and more narrow, enabling the compacting unit to be relative long and having, thus, a relative large area for heat exchange which may optionally take place. In doing this, the feed of powdery material can either be effected from above over the whole length of the screw 3 by making the screw housing open on its top side (i.e. the wall 12 is omitted), or via a feed opening 13, as shown. In order to enable a simple adaptation to the use of the compacting apparatus according to the invention with or without a mill, the wall 12 may be formed as an easily detachable element, e.g. having a snap seat or a peripheral horizontal flange for fastening by means of tightening members, so that feeding can either be done via the opening 13 or over the whole axial length of the feeding device 3.

Figure 2:
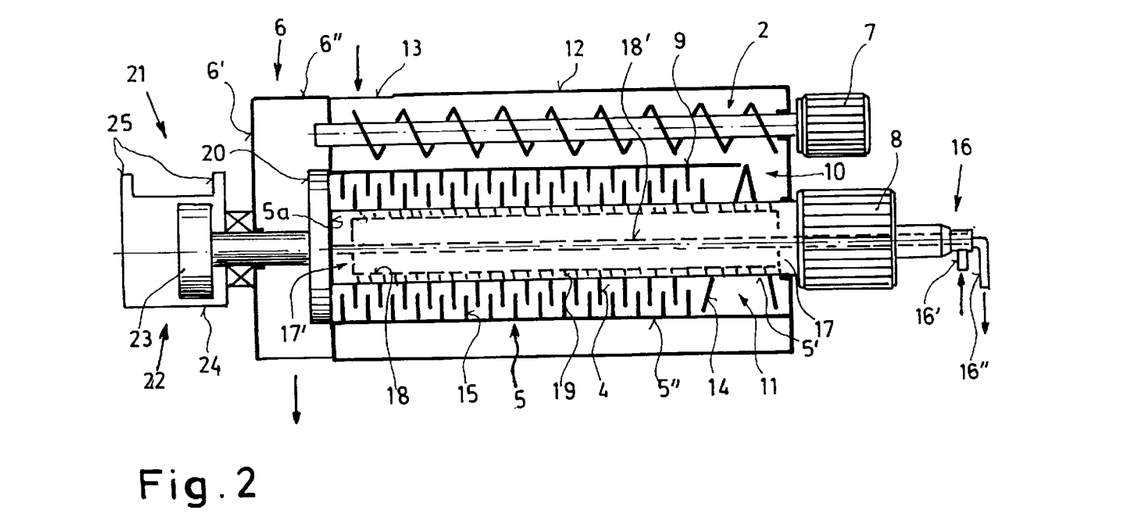
FIG. 2 a schematical illustration of another embodiment of an apparatus according to the invention in a longitudinal cross-section.

The rotor 5' of the compacting unit 2 below the feeding device or screw 3 is suitably provided with a transfer screw 14 beneath the opening 10, although, in principle, it would also be possible to provide already here the paddles 4 (see FIG. 1), in FIG. 2 schematically indicated by strokes. FIG. 2 shows also that the stator 5", formed by the walls which surround the rotor 5', might be equipped with stator tools 15, as is preferred. These stator tools which co-operate with the paddles 4 favorize agglomeration of the coffee powder particles and effect a momentary compression when the paddles 4 pass in-between, subsequently provoking a relaxation.

In an embodiment according to FIG. 2, this effect can be utilized for cooling the rotor 5', as is indicated by interrupted lines, and/or the stator 5", thus enabling, in turn, a higher compaction degree without the risk of overheating the product. It will be understood that, while those skilled in the art have obviously not thought of such cooling up to now, is of an inventive character independently from the possibility of a separate adjustment of energy absorption. The cooling arrangement may be of any type as has become known for a variety of rotors, such as cooled milling rolls or rotors of agitator mills as well as for various stators. Only some of the possible arrangements, as especially useful for the present purposes, shall now be described with reference to FIGS. 2 and 3, but it will be understood with reference to the above indication that numerous modifications can be made in this respect.

In the case of cooling the rotor 5', the shaft of motor 8 is suitably prolonged to the right side (as seen in FIG. 2), and is provided with a swivel joint 16 known per se for supply and discharge of cooling water. Within the interior of the rotor 5', cooling water supplied via a supply connection 16' enters an outer space 17 delimited by an inner body 18, the space 17 being equipped with helical cooling spirals 19. Although these cooling spirals or helices 19 have uniform distances from each other in this embodiment, it would be possible to provide different ones, in particular narrowing to the left side (with reference to FIG. 2) in order to achieve, with increasing heat content of the water, a correspondingly adapted, especially faster, flow of cooling water. It will be understood that, in the same manner as already suggested for agitator mills, the interior of the tools 4 or 15 may also be cooled. In all cases of a cooling arrangement, it is not necessary to use purely water as a coolant, but other coolants, such as vaporizing coolants, can also be used.

At the left end of the cooling spirals or helices 19 (with reference to FIG. 2) water gathers within a end side manifold space 17', and flows from there through a tube 18' extending over the length of the rotor 5' back to the swivel joint 16 where water discharged via an outlet connection 16". In order to increase the cooling efficiency by cooling the inner body 18 centered by the spirals or helices 19, the tube 18' for receiving the backwards flowing cooling water can be provided with peripheral openings, and its frontal end may be fastened to the front surface 5a of the rotor 5'.

FIG. 2 illustrates also a special embodiment of a third compacting section, i.e. of the final section 6. In order to generate a defined retainance within the compacting compartment 11, a punch-like cover member 20 is pressed by an urging assembly 21 against the open end of the compacting compartment 11, a substantially constant opening forming at the right side of the cover member 20 (with reference to FIG. 2) between the latter and the stator 5".

Figure 3:
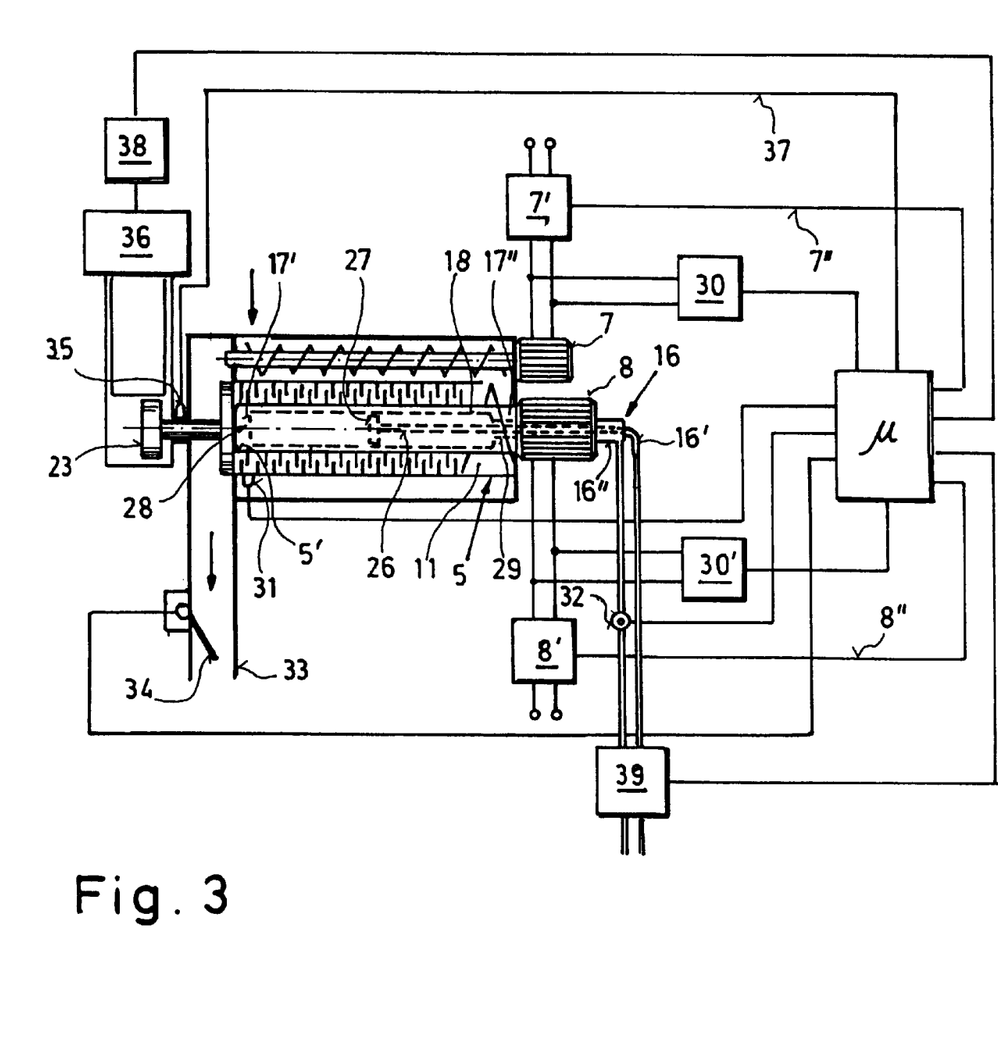
FIG. 3 a third embodiment together with a control circuit according to the invention.

In principle, it would be conceivable to displace the cover member 20 into a predetermined position, e.g. by means of a manually actuable threaded spindle, in this way determining the size of the opening thus obtained. This would correspond to the prior art and would have the consequence that the pressure within the compaction compartment 11 would change in correspondence with fluctuations of energy absorption by the device 3 and the unit 2. Therefore, it is preferred, in order to maintain an at least approximately constant pressure, to provide a pressure device, such as indicated at 21, which provides for a substantially well defined pressure. This characteristic constitutes, therefore, an invention of its own, independently from the arrangement of two separate drives. In a similar manner, the control of the outlet cross-section defined by the cover member 20 in co-operation with the stator 5" at the end of the compacting section 11, as described later with reference to FIG. 3, is of separate inventive significance.

Within the scope of the present invention, the pressure device 21 could be constructed in various ways. In the simplest case, a pressure spring of relative flat characteristic may be tightened between the cover member 20 and the opposite wall 6' so that pressure changes of this spring due to an axial movement of the cover member 20 are maintained within narrow limits and the pressure device formed by such a pressure spring urges the cover member 20 with an at least approximately constant force independent of the stroke or movement of the cover member 20. It is, however, preferred to have a fluidic, particularly pneumatic, urging assembly 22, e.g. formed by a plunger 23 and a cylinder 24, pressure fluid being supplied to the cylinder 24 through a supply connection 25. A pneumatic urging assembly is preferred, because any possible leakage can never result in contamination of the material to be compacted. Another attempt could consist in an arrangement of a threaded spindle displacing the cover member 20 as a function of a pressure signal provided by a sensor (e.g. a wire strain gauge or similar device), the spindle being driven, for example, by an electromotor.

It has already been stated that it is quite possible within the scope of the invention to use the various adjustment and setting facilities by a simple open loop control, for example, by setting the respective device manually once, e.g. at the beginning of operation. However, FIG. 3 shows a preferred embodiment comprising a control circuit, i.e. a closed loop control.

However, before describing this control circuit, the cooling arrangement for the compacting unit 2 should be mentioned which deviates somewhat from that of FIG. 2. Again a swivel joint 16 is provided, but the arrangement of the two connections 16', 16" is interchanged with respect to FIG. 2. In order to contribute to equalization of temperature within the compacting compartment 11, the cooling medium runs from the supply connection 16' through a tube 26 only up to the middle of the rotor 5', and from that through a radial channel 27 into the outer space 17 that is formed around the inner body 18 either in the form of spirals or helices, or in form of cooling channels extending substantially parallel to the axis of the rotor 5'. It will be understood that in the case of spirals, as in FIG. 2, the same would run from the radial channel 27 in either direction, the spirals extending to the right (with reference to FIG. 3) opening into a front side manifold space 17", whereas the spirals extending to the left side will open into the end side manifold space 17' situated at the back side of the rotor 5'. From this latter space 17', the path of flow runs over an opening 28 of a hollow inner body 18 back to the outlet connection 16", a tube 29 surrounding the tube 26 being provided with inlet openings at its peripheral surface within the region of the space 17".

According to FIG. 3 the two motors 7 and 8 are energized via a control stage 7' and 8'. Within the respective energizing circuit, energy consumption of the respective motor (which corresponds to the mechanical energy absorbed) is sensed by current sensors 30, 30'. Voltage sensors would also be conceivable, but are, in general, not necessary assuming a constant voltage supply. The output signal of these sensors 30, 30', optionally after transforming and/or shaping it, e.g. in an analogue/digital converter, is fed to a processing stage $\mu$, preferably in order to maintain a predetermined ratio of energy fed to the feeding device 3 and compacting section 5 respectively. In some cases, this ratio might only be kept constant temporarily, i.e. in cases when other circuits are provided to override the processor's control, for example in case of an additional cooling control or when the two sections 5 and 6 are controlled to maintain a desired compaction degree.

Optionally, the stage $\mu$ receives also a temperature signal from the outlet of the compaction compartment 11 where a temperature sensor 31 may be provided. Such a temperature sensor could be located optionally at another place, e.g. at the end of section 3 and/or at the beginning or in the middle of compacting section (compartment) 5. It is, however, preferred, if at least one such sensor is at the outlet as shown in FIG. 3.

Furthermore, the temperature of cooling water from supply 39 discharged over the connection 16" may be monitored by means of a temperature sensor 32. For this temperature is correlated to the temperature of the material that leaves the compartment 11. It will be understood that a temperature sensor may be provided for sensing (either directly or indirectly) the coolant temperature of the stator 5", if a cooling circuit is also provided for the stator 5", as is preferred. It will be clear that like cooling arrangements may be provided for the feeding device 3 and/or its screw and/or its walls 9, be it in order to pre-cool down to a temperature, e.g. below the desired final temperature, be it in order to dissipate the heat introduced by the mill 1 (in case such mill is preponed to the compacting apparatus 2, which will not be the case under all circumstances and for all applications).

While the above-mentioned parameters are representative for the energy introduced, further input signals for the processing stage $\mu$ can be chosen as to be representative for the weight/volume ratio (=specific density) or for its inverse value (=relative bulk quantity). For example, packaged units (not represented, but possibly provided subsequently to an outlet tube 33) might be weighed while their volume is determined, e.g. by monitoring their filling level, in order to form a signal corresponding to the weight/volume ratio in the processor stage $\mu$. To give an example, in the present embodiment a resilient impact plate 34 is used for sensing the weight within the tube 33, and the number of revolutions of the rotor 5' and/or the cross-section of the gap at the discharge end (left side) of the compacting section 5 may be determined, e.g. by sensing the position of the plunger rod of plunger 23 by means of a sensor 35, in order to get a signal representative for the volume. The sensor 35 may be formed in accordance with the teaching of U.S. Pat. No. 3,956,973, but can likewise include any system known per se for determining the position of a plunger. Since the position of the plunger 23 is dependent on a setting device 36 comprising at least one appropriate valve, the sensor for the position of the plunger could also be accommodated there. In any case, it is preferred that a signal corresponding to the volume discharged from the compacting section (compartment) 5 is fed to the processing stage $\mu$ via a line 37 so that this stage $\mu$ has all information available, including the weight signal from the impact plate 34, to form a signal corresponding to the weight/volume ratio of the ground and compacted material and to control the number of revolutions of the motors 7, 8 in such a manner that a desired compaction degree of the material will be attained. Insofar, the processing stage μ acts as a comparator stage which could be replaced by any other known comparing device.

To this end, the processing stage μ can supply a control signal to the control stages 7', 8' that determine the number of revolutions of the motors 7 and 8. Alternatively or in addition, the processing stage μ could vary the pressure within the compartment 11 via a stage 38, the latter controlling the valve of setting device 36. However, it is possible within the scope of the invention to assign a common adjusting device, which corresponds to one of the stages 7' or 8', to both drives 7 and 8, particularly in the case where a final compacting section 6 is provided. The control signal of the processing stage μ delivered to the control stages 7' and 8' will contain, in general, also some information about the momentary number of revolutions and, thus, about the feeding amount of material within feeding device 3 so that this amount can be directly determined by the processing stage μ. If this should not be the case, either a sensor for the number of revolutions could be assigned to the respective device 3 or section 5 or the line 7" or 8", that connects the processing stage μ with the respective control stage 30 or 30' could be formed as a bus so as to give a feed back signal about the number of revolutions to the processing stage μ.

It is favorable, if the program of the processing stage μ is designed in such a manner that it operates as a sequential control so that individual sections are sequentially controlled. In doing this, energy is first controlled in a previous section, that is either in the feeding section 3 situated before the compacting unit 2 and/or in the final compacting section 6 which is situated before the compacting unit 2. When a limit value is reached in controlling the previous section, the energy of the postponed section, i.e. of the compacting unit 2 situated after the feeding section 3 and/or in the final compaction section 6 situated after the compacting unit 2, is controlled. To this end, the processing stage μ comprises a sensing arrangement for at least one limit value (this sensor arrangement is not shown separately and is, particularly, contained in the software of the processing stage μ).

In particular, the arrangement is such that the limit value is a limit for a parameter of power of the second section 5, especially measured by stage 30'. When this limit value is reached, the third or final section 6 is controlled. The reason for this measure is that the feeding rate, as represented by the number of revolutions of the screw 3, has also to take the quantity of material fed per time unit from the mill 1 (if the apparatus is used in conjunction with a mill 1) into account in order to avoid any backwash or idle rotating. Therefore, the screw 3 is preferably controlled only in exceptional cases where it is preferred that the feeding section is first controlled so as to keep the temperature at the temperature sensor 31 and/or the current consumption of its motor 7 constant, before this is done in the compacting section 5. In this way, any backwash is recognized relative early and can be kept under control. This, however, is the more a reason why the ratio of energy absorption within the feeding device 3 and the section 5 should conveniently be monitored by the processing stage μ. From the above, it will be understood that the ratio of absorbed energy can also be monitored by temperature sensors, although this will, at least in general, not be desired for the resulting proportional reset control characteristics. In contrast, one would rather strive for at least a differential proportion in the control characteristics, especially for a proportional-differential (PD) control.

In all these control procedures, also the temperature signal (see sensor 31) can be used, and since the parameters to be monitored are substantially the same as those described in German patent DE-A-29 32 783 (which, however, relates to a completely different technical field), it may be seen that controlling, in the case of FIG. 3, could be done analogously to that of this the German patent. As in this the German patent, the control according to the present invention can be designed as an adaptive control where the respective nominal value is variable. A further possibility within the scope of the present invention consists in that a mathematical model is applied which may reduce the expenditure for sensors and/or provides additional information for the a more accurate or faster control. In comparison with the above-mentioned the German patent, the feeding device 3 will play the role of the feeding pump mentioned in the German patent for feeding the liquid material forming the medium in the known control. The feeding device 3 may, by the way, also be formed as a chain, e.g. having disk-shaped flights interconnected by the chain in their respective center, or being designed as a trough conveyor chain.

When, in the framework of this description, "absorption" of energy is mentioned, it will be seen from the above that it is the question of either the energy consumption of the motors 7 and 8 (or of any other driving device) and/or of transfer of this energy to the bulk material for the purpose of compaction thereof.

What is claimed is:

1. An apparatus for compacting particulate material of a first weight/volume ratio to a predetermined compaction degree of a predetermined ultimate weight/volume ratio, the apparatus comprising:

first wall means forming a first compartment having an inlet at one end of the compartment and an outlet at a second end opposite the one end;

a transfer opening, and second wall means forming a second compartment having an inlet at one end and an outlet at a second end of said second wall means, the inlet of said second compartment being in communication with the outlet of said first compartment via the transfer opening;

feeding means for feeding said first compartment, said feeding means advancing the particulate material along a first path from the inlet to the outlet in said first compartment;

particle pushing means within said second compartment operative to push particles of the material against each other, said particle pushing means comprising an apparatus arranged along an axis of revolution of the particle pushing means for pushing the particles against each other and allowing the particles to pass in a passage from said inlet to said outlet along said axis, said axis being parallel to said path to provide a compact configuration to the apparatus;

a cover member at the outlet of said second compartment and being located at an outlet end of said passage to form with said particle pushing means an opening for egress of said particulate material at the outlet of said second compartment;

urging means operatively connecting with said cover member to urge said cover member toward said particle pushing means in a direction opposite a direction of the flow of the particulate matter along said axis for adjustment of said opening at the outlet of said second compartment, and wherein said urging means is operative to maintain a predetermined value of pressure against said cover member during a flow of the particulate matter in said passage;

first drive means for driving said feeding means, said feeding means extending alongside said transfer opening and parallel to a longitudinal extent of said particle pushing means to accomplish pre-compaction and uniform delivery of the particulate material into said second compartment with enlarged area for heat exchange; and second drive means for driving said particle pushing means independently from said feeding means;

wherein operating speeds of said first and said second drive means and the pressure of said urging means are adjusted relative to each other for a uniform control of heat produced by interaction of particles of the particulate material driven by said feeding means and by said particle pushing means; and wherein in each of said first and said second compartments, the inlet port and the outlet port are spaced apart along a longitudinal dimension of the compartment, and a longitudinal wall of said first compartment faces a longitudinal wall of said second compartment to provide a compact configuration to the apparatus.

2. Apparatus as claimed in claim 1, wherein said cover member serves as a final compacting means at the outlet of said second compartment.

3. Apparatus as claimed in claim 2, wherein said final compacting means further comprises said urging means to move said cover member towards said outlet under a certain force.

4. Apparatus as claimed in claim 3, further comprising force adjusting means for adjusting the force of said urging means.

5. Apparatus as claimed in claim 1, further comprising at least one adjusting means assigned to at least one of said drive means for adjusting its driving energy.

6. Apparatus as claimed in claim 5, wherein each of said drive means is adjustable.

7. Apparatus as claimed in claim 6, wherein each of said drive means has a separate adjusting means assigned.

8. Apparatus as claimed in claim 5, further comprising closed loop control means including measuring means for determining at least one parameter of the weight/volume ratio of said material at the end of the last section of the apparatus, said measuring means providing an output signal of a corresponding value;

comparison means receiving said output signal and comparing its value with a desired nominal value to provide an error signal when said corresponding value deviates from said nominal value;

said adjusting means being controlled by said error signal.

9. Apparatus as claimed in claim 8, further comprising sequential control means for sequentially controlling said first and second drive means.

10. Apparatus as claimed in claim 9, further comprising limit sensor means for sensing a control limit of said closed loop control means and for delivering a switch over signal to said sequential control means upon reaching said control limit.

11. Apparatus as claimed in claim 10, wherein said limit sensor means comprise at least one sensor means for sensing the energy consumption of at least one of said first and second drive means.

12. Apparatus as claimed in claim 10, wherein said limit sensor means comprise at least one temperature sensor for deriving a signal correlated to a temperature of said material.

13. Apparatus as claimed in claim 1, further comprising means for controlling the amount of energy fed to said first and second drive means so as to maintain the ratio of these amounts at least temporarily constant.

14. Apparatus as claimed in claim 1, wherein said feeding means and said compacting means are situated in different planes.

15. Apparatus as claimed in claim 1, wherein at least one of said feeding means and said compacting means comprise rotor means, the corresponding wall means forming a stator which surrounds said rotor means.

16. An apparatus for compacting particulate material of a first weight/volume ratio to a predetermined compaction degree of a predetermined ultimate weight/volume ratio, the apparatus comprising:

first wall means forming a first compartment having an inlet at one end of the compartment and an outlet at a second end opposite the one end;

a transfer opening, and second wall means forming a second compartment having an inlet at one end and an outlet at a second end of said second wall means, the inlet of said second compartment being in communication with the outlet of said first compartment via the transfer opening;

feeding means for feeding said first compartment, said feeding means advancing the particulate material along a first path from the inlet to the outlet in said first compartment, said feeding means extending alongside said transfer opening and parallel to a longitudinal extent of said particle pushing means to accomplish pre-compaction and uniform delivery of the particulate material into said second compartment with enlarged area for heat exchange;

particle pushing means within said second compartment operative to push particles of the material against each other, said particle pushing means comprising an apparatus arranged along an axis of revolution of the particle pushing means for pushing the particles against each other and allowing the particles to pass in a passage from said inlet to said outlet;

final compacting means at the outlet of said second compartment, said final compacting means comprising pressure means with a cover member moveable, along said axis, said cover member being located at the outlet of said second compartment and being located at an outlet end of said passage to form with said particle pushing means an opening for egress of said particulate material at the outlet of said second compartment; and urging means to move said pressure means towards said particle pushing means under a predetermined force being uniform independently from the movement of said pressure means;

wherein operations of said feeding means and said particle pushing means and said final compacting means are adjusted relative to each other for a uniform control of heat produced by interaction of particles of the particulate material driven by said feeding means and by said compacting means; and wherein said apparatus of said second compartment comprises coaxial coolant conduits disposed along said axis of revolution for conducting a coolant to and from said apparatus for extraction of heat produced by said pushing of the particles; and said second compartment further comprises helical cooling spirals spaced apart from said apparatus for further extraction of the heat produced by said pushing of the particles; and wherein, in each of said first and said second compartments, the inlet port and the outlet port are spaced apart along a longitudinal dimension of the compartment, and a longitudinal wall of said first compartment faces a longitudinal wall of said second compartment to provide a compact configuration to the apparatus.

17. Apparatus as claimed in claim 16, wherein said urging means are fluidic urging means comprising a piston in a cylinder.

18. Apparatus as claimed in claim 17, wherein said fluidic urging means are pneumatic urging means.

19. Apparatus as claimed in claim 16, further comprising closed loop control means including sensor means for at least one of the following parameters:
   a) for the amount of material supplied by said feeding means per time unit,
   b) for at least one parameter of energy consumption of said second drive means,
   c) for deriving a signal correlated to the temperature of said material, and
   d) for at least one parameter determining said ultimate ratio;
   said urging means being controlled by said sensor means.

20. Apparatus as claimed in claim 16, wherein at least one of said feeding means and said compacting means comprise rotor means, the corresponding wall means forming a stator which surrounds said rotor means, at least one of said rotor means and stator comprising said cooling means.

21. An apparatus for compacting particulate material of a first weight/volume ratio to a predetermined compaction degree of a predetermined ultimate weight/volume ratio, the apparatus comprising:
   first wall means forming a first compartment having an inlet at one end of the compartment and an outlet at a second end opposite the one end;
   a transfer opening, and second wall means forming a second compartment having an inlet at one end and an outlet at a second end of said second wall means, the inlet of said second compartment being in communication with the outlet of said first compartment via the transfer opening;
   cooling means for at least one of said compartments; and wherein said apparatus further comprises particle pushing means disposed in said second compartment for introducing successive amounts of compaction to said material, said particle pushing means being operative to push particles of the material against each other and along a passage towards an outlet of said particle pushing means;
   feeding means extending within said first compartment alongside said transfer opening and parallel to a longitudinal extent of said particle pushing means to accomplish pre-compaction and uniform delivery of the particulate material into said second compartment with enlarged area for heat exchange;
   wherein said particle pushing means comprises an apparatus arranged along an axis of revolution of the particle pushing means for pushing the particles against each other and allowing the particles to pass from said inlet to said outlet of said second compartment, said cooling means cooperating with said particle pushing means to inhibit development of excessive temperature of the particulate matter in said particle pushing means;
   wherein said apparatus further comprises a cover member at the outlet of said second compartment and being located at an outlet end of said passage to form with said particle pushing means an opening for egress of said particulate material at the outlet of said second compartment;
   urging means operatively connecting with said cover member to urge said cover member toward said particle pushing means in a direction opposite a direction of the flow of the particulate matter along said axis for adjustment of said opening at the outlet of said second compartment, and wherein said urging means is operative to maintain a predetermined value of pressure against said cover member during a flow of the particulate matter in said passage; and
   said feeding means and said particle pushing means and said urging means are independently operable; and
   wherein, each of said first and said second compartments, the inlet port and the outlet port are spaced apart along a longitudinal dimension of the compartment, and a longitudinal wall of said first compartment faces a longitudinal wall of said second compartment to provide a compact configuration to the apparatus.

22. Apparatus as claimed in claim 21, further comprising closed loop control means including measuring means for deriving a signal correlated to a temperature of said material and for providing an output signal of a corresponding value; and
   setting means controlled by said output signal for adjusting a cooling power of said cooling means to match a certain nominal value.

23. Apparatus as claimed in claim 22, wherein said measuring means derives its signal from the temperature of at least one of said rotor means and said stator in contact with said material.

24. An apparatus for compacting particulate material of a first weight/volume ratio to a predetermined compaction degree of a predetermined ultimate weight/volume ratio, the apparatus comprising:
   a first compartment having an inlet at one end of the compartment and an outlet at a second end opposite the one end;
   a second compartment having an inlet at one end and an outlet at a second end of said second compartment, the inlet of said second compartment being in communication with the outlet of said first compartment;
   feeding means for feeding said first compartment;
   particle pushing means within said second compartment operative to push particles of the material against each other, said particle pushing means comprising a rotor with paddles arranged along an axis of revolution of the rotor, and a stator with stator tools facing said paddles and arranged along said axis of revolution, rotation of said rotor serving to push the particles against each other and to pass the particles in a passage from said inlet to said outlet;
   a cover member at the outlet of said second compartment and being located at an outlet end of said passage to form with said particle pushing means an opening for egress of said particulate material at the outlet of said second compartment;
   urging means operatively connecting with said cover member to urge said cover member toward said particle pushing means in a direction opposite a direction of the flow of the particulate matter along said axis for adjustment of said opening at the outlet of said second compartment, and wherein said urging means is operative to maintain a predetermined value of pressure against said cover member during a flow of the particulate matter in said passage; and first drive means for driving said feeding means, said feeding means extending within said first compartment alongside and parallel to a longitudinal extent of said particle pushing means to accomplish pre-compaction and uniform delivery of the particulate material into said second compartment with enlarged area for heat exchange; and second drive means for driving said particle pushing means independently from said feeding means;

cooling means carried by said rotor and fed by cooling fluid via a shaft of said rotor for extraction of heat produced by said pushing of the particles;

wherein said stator further comprises helical cooling spirals spaced apart from said rotor for further extraction of the heat produced by said pushing of the particles; and wherein operating speeds of said first and said second drive means and of said urging means are adjusted relative to each other for a uniform control of heat produced by interaction of particles of the particulate material driven by said feeding means and by said particle pushing means, said heat being withdrawn, at least in part, by said helical cooling spirals of said stator; and wherein, each of said first and said second compartments, the inlet port and the outlet port are spaced apart along a longitudinal dimension of the compartment, and a longitudinal wall of said first compartment faces a longitudinal wall of said second compartment to provide a compact configuration to the apparatus.

25. An apparatus for compacting particulate material of a first weight/volume ratio to a predetermined compaction degree of a predetermined ultimate weight/volume ratio, the apparatus comprising:

a first compartment having an inlet at one end of the first compartment and an outlet at a second end opposite the one end;

a second compartment having an inlet at one end and an outlet at a second end of said second compartment, the inlet of said second compartment being in communication with the outlet of said first compartment;

feeding means for feeding said first compartment;

particle pushing means within said second compartment operative to push particles of the material against each other, said particle pushing means comprising a rotor with paddles arranged along an axis of revolution of the rotor, and a stator with stator tools facing said paddles and arranged along said axis of revolution, rotation of said rotor serving to push the particles against each other and to pass the particles from said inlet to said outlet of said second compartment, said feeding means extending within said first compartment alongside and parallel to a longitudinal extent of said particle pushing means to accomplish pre-compaction and uniform delivery of the particulate material into said second compartment with enlarged area for heat exchange;

final compacting means at the outlet of said second compartment, said final compacting means comprising pressure means with a cover member moveable along said axis, said cover member being located at the outlet of said second compartment and being located at an outlet end of said passage to form with said particle pushing means an opening for egress of said particulate material at the outlet of said second compartment;

urging means to move said pressure means towards said particle pushing means under a predetermined force being uniform independently of the movement of said pressure means; and cooling means carried by said rotor and fed with cooling fluid via a shaft of said rotor for extraction of heat produced by said pushing of the particles;

wherein said stator further comprises helical cooling spirals spaced apart from said rotor for further extraction of the heat produced by said pushing of the particles; and wherein operations of said feeding means and said particle pushing means and said final compacting means are adjusted relative to each other for a uniform control of heat produced by interaction of particles of the particulate material, said helical cooling spirals of said stator serving to withdraw heat from said particle interaction; and wherein, each of said first and said second compartments, the inlet port and the outlet port are spaced apart along a longitudinal dimension of the compartment, and a longitudinal wall of said first compartment faces a longitudinal wall of said second compartment to provide a compact configuration to the apparatus.

26. An apparatus for compacting particulate material of a first weight/volume ratio to a predetermined compaction degree of a predetermined ultimate weight/volume ratio, the apparatus comprising:

a first compartment having an inlet at one end of the compartment and an outlet at a second end opposite the one end;

a second compartment having an inlet at one end and an outlet at a second end of said second compartment, the inlet of said second compartment being in communication with the outlet of said first compartment;

feeding means for feeding said first compartment;

particle pushing means within said second compartment operative to push particles of the material against each other, said particle pushing means comprising a rotor with paddles arranged along an axis of revolution of the rotor, and a stator with stator tools facing said paddles and arranged along said axis of revolution, rotation of said rotor serving to push the particles against each other and to pass the particles in a passage from said inlet to said outlet;

a cover member at the outlet of said second compartment and being located at an outlet end of said passage to form with said particle pushing means an opening for egress of said particulate material at the outlet of said second compartment;

urging means operatively connecting with said cover member to urge said cover member toward said particle pushing means in a direction opposite a direction of the flow of the particulate matter along said axis for adjustment of said opening at the outlet of said second compartment, and wherein said urging means is operative to maintain a predetermined value of pressure against said cover member during a flow of the particulate matter in said passage; and first drive means for driving said feeding means, said feeding means extending within said first compartment alongside and parallel to a longitudinal extent of said particle pushing means to accomplish pre-compaction and uniform delivery of the particulate material into said second compartment with enlarged area for heat exchange; and second drive means for driving said particle pushing means independently from said feeding means;

wherein operating speeds of said first and said second drive means and of said urging means are adjusted relative to each other for a uniform control of heat produced by interaction of particles of the particulate material driven by said feeding means and by said particle pushing means; and wherein, each of said first and said second compartments, the inlet port and the outlet port are spaced apart along a longitudinal dimension of the compartment, and a longitudinal wall of said first compartment faces a longitudinal wall of said second compartment to provide a compact configuration to the apparatus.

* * * * *